(12) United States Patent
Hansen

(10) Patent No.: US 6,354,539 B1
(45) Date of Patent: Mar. 12, 2002

(54) PARACHUTE WITH ACTIVE DEPLOYMENT

(75) Inventor: Holger Hansen, Hamburg (DE)

(73) Assignee: Autoflug GmbH & Co. (DE)

( * ) Notice: Subject to any disclaimer, the term of this patent is extended or adjusted under 35 U.S.C. 154(b) by 0 days.

(21) Appl. No.: 09/622,997

(22) PCT Filed: Feb. 19, 1999

(86) PCT No.: PCT/DE99/00537

§ 371 Date: Aug. 25, 2000

§ 102(e) Date: Aug. 25, 2000

(87) PCT Pub. No.: WO99/43546

PCT Pub. Date: Sep. 2, 1999

(30) Foreign Application Priority Data

Feb. 25, 1998 (DE) .......................................... 198 07 671

(51) Int. Cl.⁷ .............................................. B64D 17/00
(52) U.S. Cl. ....................................... 244/147; 244/142
(58) Field of Search ................................ 244/142, 145, 244/147, 148, 149, 150, 152

(56) References Cited

U.S. PATENT DOCUMENTS

| | | | |
|---|---|---|---|
| 2,736,524 A | * | 2/1956 | Thebault |
| 2,929,589 A | * | 3/1960 | Carter et al. |
| 2,980,371 A | * | 4/1961 | Finney |
| 3,887,151 A | * | 6/1975 | Matsuo ........................ 244/152 |
| 4,117,994 A | * | 10/1978 | Webb .......................... 244/152 |
| 4,752,050 A | * | 6/1988 | Johnson ....................... 244/152 |
| 4,846,423 A | * | 7/1989 | Reuter ......................... 244/145 |
| 4,927,099 A | * | 5/1990 | Emerson et al. ............. 244/152 |
| 4,955,564 A | * | 9/1990 | Reuter ......................... 244/149 |
| 5,209,436 A | * | 5/1993 | Lee ............................. 244/152 |

FOREIGN PATENT DOCUMENTS

| | | | | |
|---|---|---|---|---|
| DE | 3622456 A | * | 1/1988 | |
| FR | 858140 A | * | 7/1939 | |

* cited by examiner

Primary Examiner—Peter M. Poon
Assistant Examiner—Kevin Jakel
(74) Attorney, Agent, or Firm—R.W. Becker & Associates; R. W. Becker

(57) ABSTRACT

A parachute for decelerating an object is provided which includes a parachute canopy having an apex and a base and rigging lines attached to the base and attached to the object. The parachute canopy and the rigging lines are configured as a reefed pack with the parachute canopy being folded into a plurality of concentric folds one upon the other from the base to the apex across the full height of the parachute canopy. The parachute may also include a plurality of control lines associated with respective ones of the concentric folds of the parachute canopy to form therewith individual deployment zones. A control apparatus for controlling the targeted release of the folds controls line cutters to cut the respective control lines associated with the individual deployment zone to be deployed.

11 Claims, 4 Drawing Sheets

PARACHUTE WITH ACTIVE DEPLOYMENT

This specification incorporates by reference the disclosure of German priority document 19807.

BACKGROUND OF THE INVENTION

The invention relates to a parachute comprising a parachute canopy having an apex and a base as well as rigging lines attached to the base for retaining the object to be decelerated by the parachute, whereby the parachute is prepared for its use by folding of its parachute canopy as well as its rigging lines into a reefed pack.

Such parachutes are known by virtue of their use in a multitude of situations, whereby the parachute canopy of such a parachute, in the context of its preparation, is prepared for its situational use. The applicable reefed pack is thus typically configured such that the parachute canopy with carry lines is laid out in an extended configuration and, thereafter, is continuously folded in a direction from the apex to the base, whereby, from the beginning of the deployment, the air flow enters into the parachute canopy from the base and the bottleneck pressure resulting therefrom operates to effect deployment of the parachute canopy. As a result of such reefing configurations, the bottleneck pressure is first effective only when the parachute canopy, including the rigging lines which retain the object to be decelerated, have achieved an extended disposition.

The known parachutes bring therewith the disadvantage that, in connection with the extension of the parachute canopy including the rigging lines, there occurs a respective deployment impact or an extension impact which amounts to a considerable loading of the parachute, in dependence upon the instantaneous velocity existing at that moment of deployment. It follows from this that, in connection with high setting out speed and the correspondingly high flow velocity, the phenomenon can occur in which the air mass which is required to expand out the parachute canopy, once the parachute canopy has been pulled from the pack tube and extended, does not follow the flow velocity of the first impact of air which flows from the base to the apex, whereby the base of the parachute canopy closes again onto itself and the deployment is not achieved.

A further disadvantage exists in that, in connection with the intended situational use of the parachute such as, for example, an aircraft braking means, a stabilization parachute, a load parachute, or a personnel rescue parachute, and the resultant setting out speed of the parachute canopy which is correspondingly developed as a result of the particular situational use, it is necessary to use different customized web constructions such as, for example, in the form of banded parachutes or in the form of various parachute canopy materials having differing air through passage characteristics, whereby different parachutes must be kept available for handling different situational uses.

The invention solves the challenge of providing a parachute of the type deployable in a broad range of uses and which ensures a secure deployment in these uses.

SUMMARY OF THE INVENTION

The solution of this challenge, as well as the advantageous configurations and enhancements of the invention, are derivable from the subject matter of the patent claims which follow this description.

The invention provides, as its base concept, that the packing of the parachute canopy is comprised of concentric gathered folds obtained by gathering the parachute canopy fabric, which is laid out in the inflated airborne shape of the parachute, across the entire circumference of the parachute canopy from the base to the apex and across the full height of the parachute canopy.

The invention has the advantage that, as a result of the gathering of the parachute canopy into individual folds across the height of the parachute canopy, the base of the parachute canopy remains open in the respective inflow direction, whereupon a secure deployment results as well in the event of a high air inflow velocity. In such event, the bottleneck pressure which is applied to the apex of the parachute canopy upon the beginning of the deployment ensures a sequential unfolding of the individual folds and, in fact, ensures such a sequential unfolding in correspondence with the blocking pressure being applied against the object to be decelerated. As a consequence of this occurrence, a proportional unfolding of the parachute canopy advantageously occurs with respect to the respectively applied bottleneck pressure, whereby, in the event of a high inflow velocity, only a small parachute surface is respectively unfolded or released via unrolling of the folds while, in the event of a lower inflow velocity, the release of a greater parachute surface is effected. In this manner, the security of the parachute is collectively improved because an immediate complete opening of the parachute without additional unfolding means can be ensured even in the event of a setting out of the parachute at a low height and at a low speed. Another advantage is obtained during the deployment by virtue of the serial unfolding of the concentric gathered folds in that the rigging lines attached to the base of the parachute canopy are by and by lengthened in correspondence with the respective deployment of the parachute canopy whereby a deployment impact or extension impact is substantially avoided or occurs only in a very mitigated form.

A computation can be applied to a respective situational use of a parachute, in accordance with one embodiment of the invention, such that a plurality of concentric gathered folds can be coupled to one another in a predetermined manner via the surrounding control lines to create individual deployment zones. In this regard, it is possible, during the packing of a parachute, to prospectively arrange its opening sequence, whereby the control lines can be configured with differing breaking strengths to effect the creation of the individual deployment zones. In this manner, the sequential deployment of the thus configured deployment zones can be preset to react in correspondence with the occurrence of an anticipated bottleneck pressure during the deployment of the parachute.

The invention offers, in a beneficial manner, the hitherto unavailable possibility to configure different parachute constructions into a single parachute canopy, such that, in accordance with an embodiment of the invention, there is provided a parachute canopy comprised of sections of differing web constructions and each respective section is matched up to a prescribed deployment zone. In this manner, in accordance with the respective situational use of a parachute, a different web construction—such as, for example, in the form of a banded parachute or a web construction having a different porosity—can be configured for each individual deployment zone so that a deployment of the parachute in any given air velocity category can be achieved with the desired spread of the parachute by a targeted time-delayed release or a release corresponding to the respective instantaneous bottleneck pressure of the individual deployment zones.

It is accordingly provided in one embodiment of the invention that the gathered rigging lines are attached to the respective lowermost fold of the individual deployment zone. In this manner, it is ensured that a lengthening of the rigging lines occurs only in that respective spread as the respective fold is released during deployment of the parachute.

In accordance with a preferred embodiment of the invention, the apex of the parachute canopy is arranged on a platform. The configuration of the platform permits further advantageous embodiments of the invention. In this regard, it can be provided that the folds are disposed on the platform and are unrollable from the platform during deployment of the parachute. This results, during packing of the parachute canopy, in a readily deployable packed parachute unit. The deployment of such a packed parachute effects the creation of a bottleneck pressure of a calculable magnitude necessary for a deployment of the parachute against the platform.

Moreover, in accordance with an embodiment of the invention, it can be provided that a control apparatus is disposed on the platform for targeted release of the folds, whereby a line cutter controlled by the control apparatus can effect controlled cutting of the control lines which hold the deployment zones in their gathered configurations. The targeted release of the folds made possible by this embodiment also effects the release of the attached rigging lines.

In accordance with an embodiment of the invention, it is provided that the control apparatus includes an air flow measuring device. In this manner, the possibility is provided for the control apparatus to control the release of the deployment zones and the rigging lines in correspondence with the actual velocity or the instantaneous bottleneck pressure produced thereby.

Alternatively, it can be provided that the control device includes an associated data storage device for storing data by which the deployment course of the parachute canopy can be controlled. In this regard, a predetermined sequential opening of the parachute canopy can be programmed in the data storage device either as a fixed opening sequence or in correspondence with the occurrence of certain deployment conditions which have previously been determined, whereby the number of respective deployment zones to be released is generated with regard to the necessity to overcome the actually occurring velocity range and can be differentially pre-programmed in accordance with the respective situational use of the parachute.

BRIEF DESCRIPTION OF THE DRAWINGS

An embodiment of the invention is shown in the drawings which are hereafter described. It is seen that.

DESCRIPTION OF PREFERRED EMBODIMENTS

Figure 1:
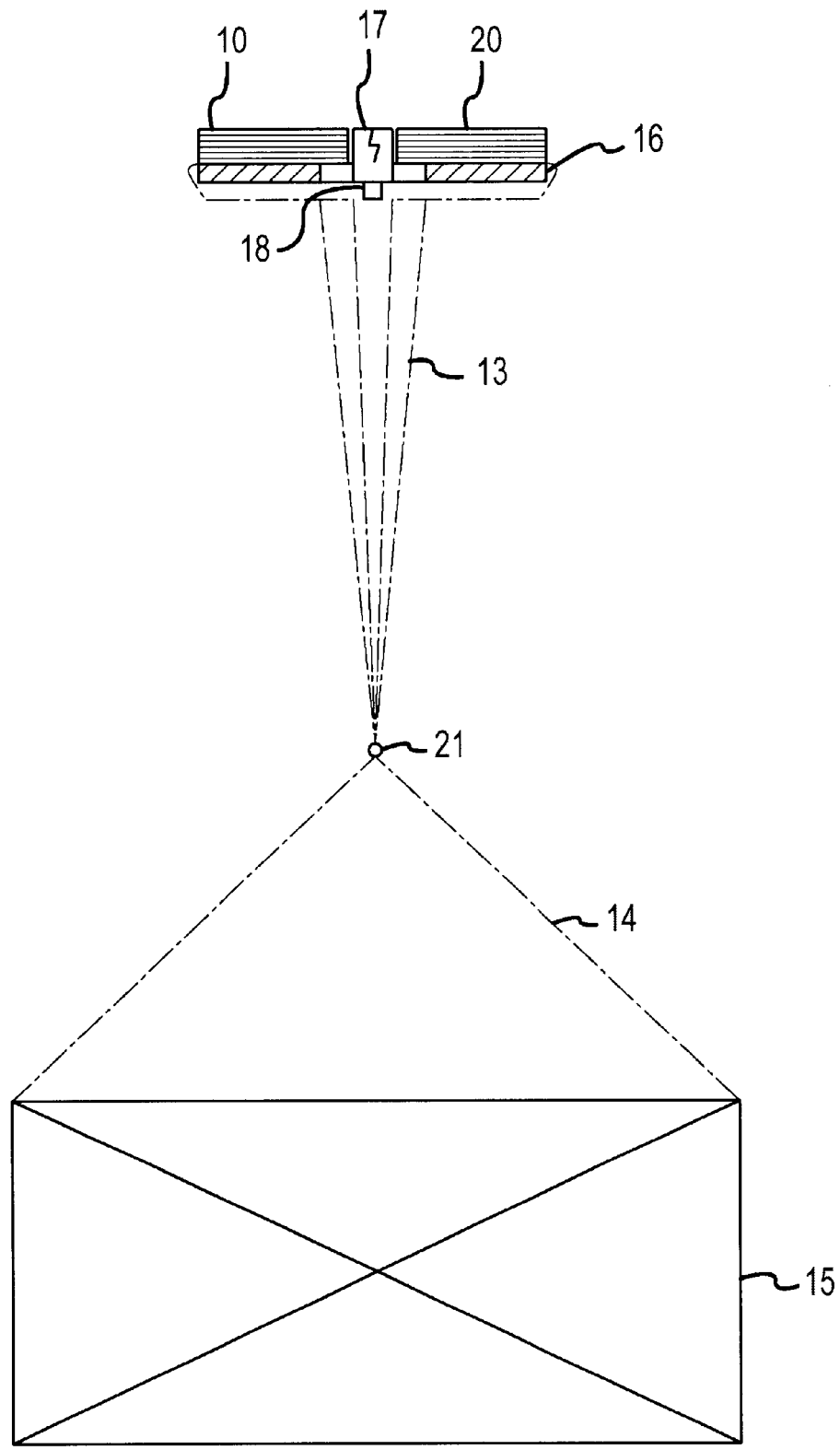
FIG. 1 shows a parachute, after the throwing out of the parachute and before the beginning of the deployment of the parachute canopy, the parachute having an object to be decelerated suspended therefrom.
Figure 2:
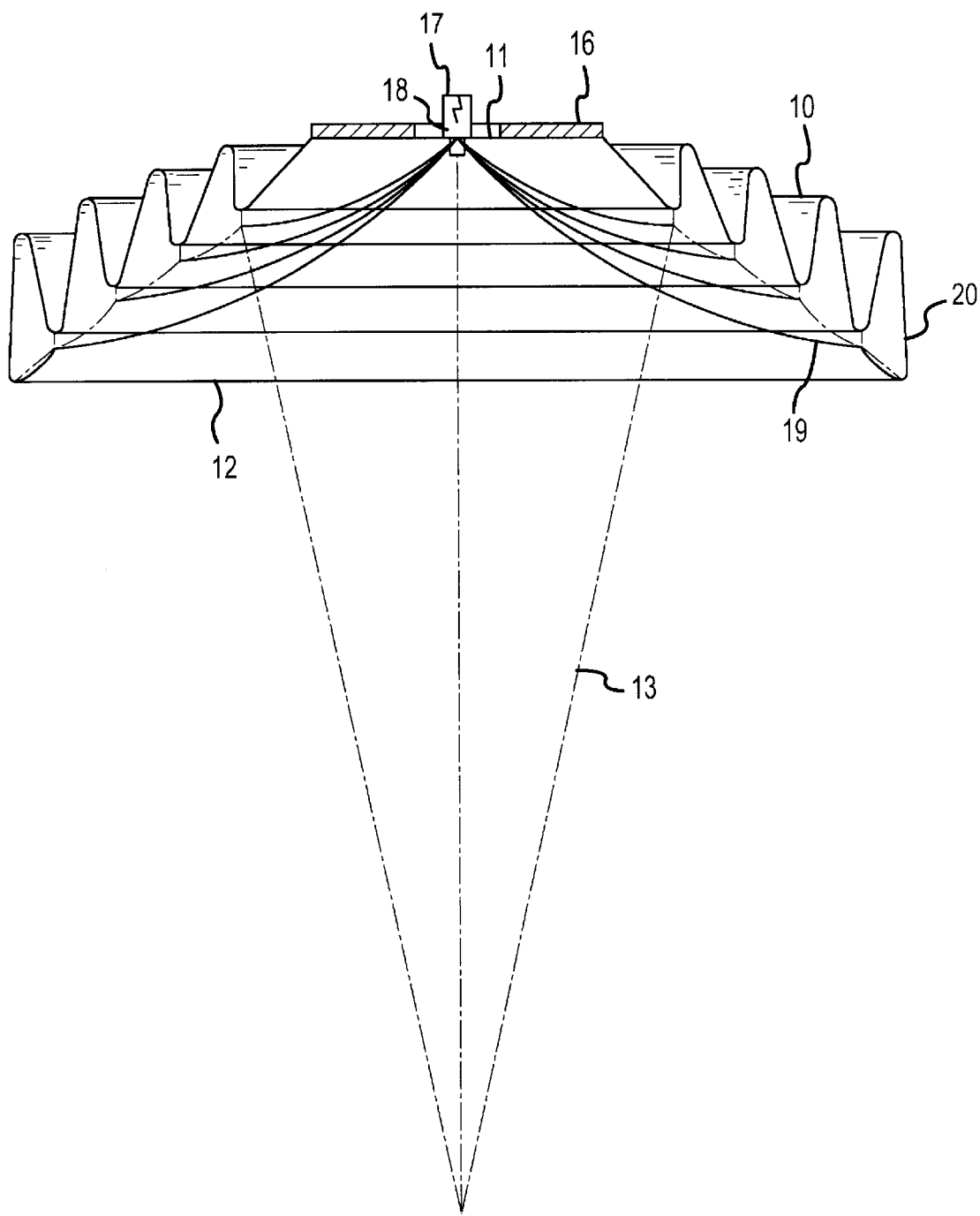
FIG. 2 shows a first stage of the deployment of the parachute canopy with the deployment of a first fold zone.
Figure 3:
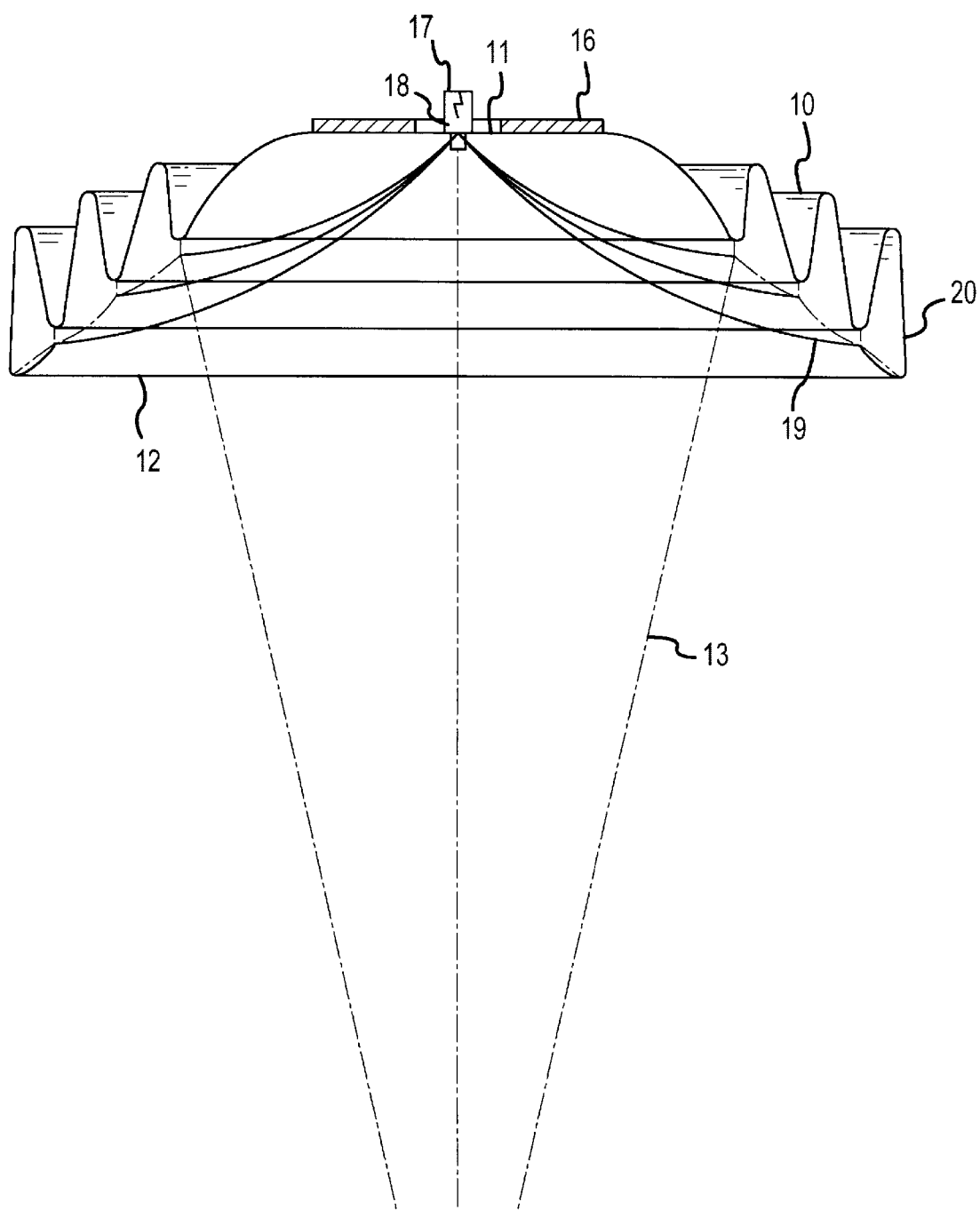
FIG. 3 shows the parachute shown in FIG. 2 during the deployment of a second fold zone.
Figure 4:
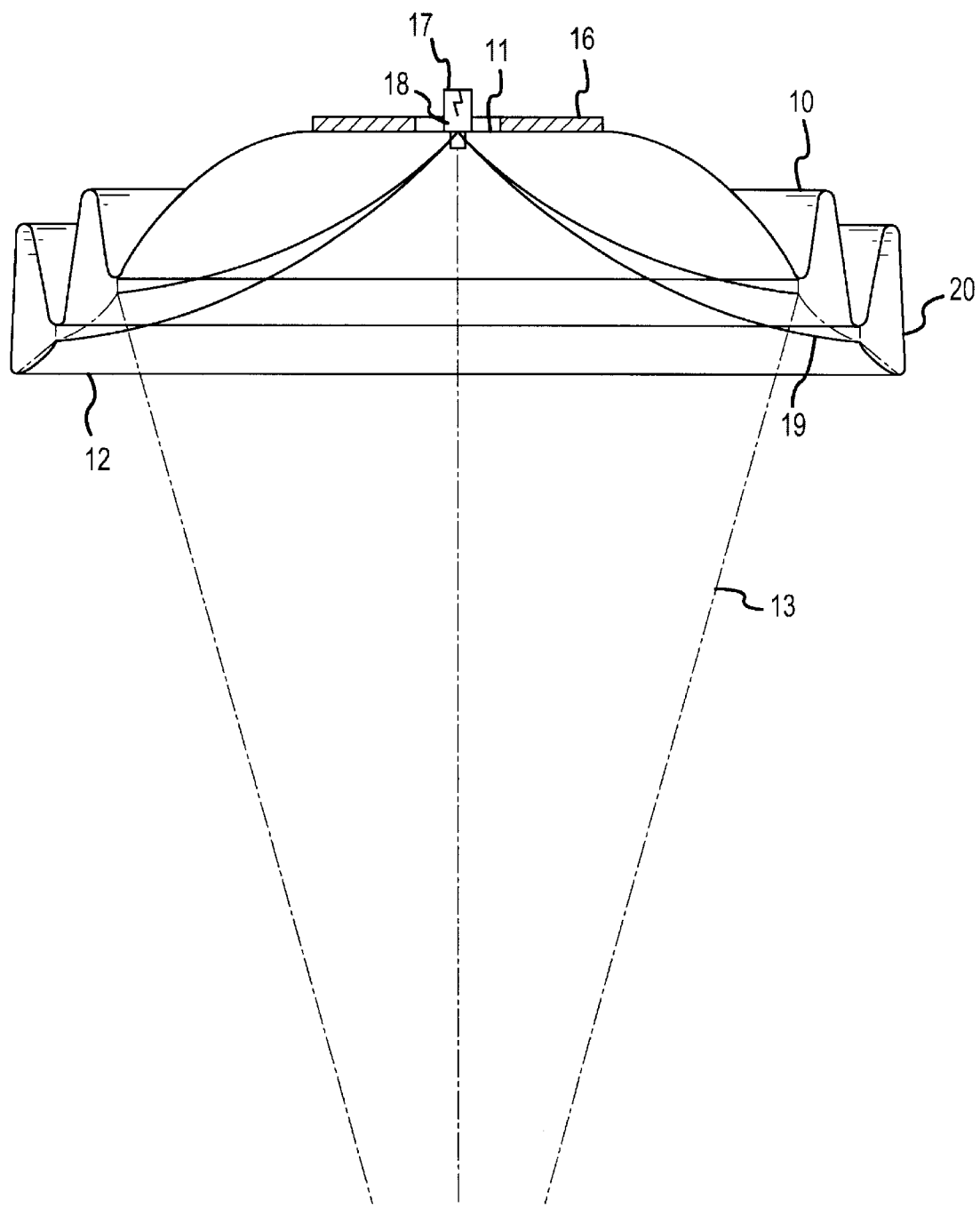
FIG. 4 shows the parachute shown in FIG. 3 during the deployment of a further fold zone.

A parachute is shown in FIG. 1 after throwing out of the parachute for its deployment with a separation of the parachute canopy 10 from the object to be decelerated 15. The object to be decelerated 15 is attached via carry lines 14 to a rigging line coupling 21 from which rigging lines 13 extend to the parachute canopy 10 and are attached to the base 12 of the parachute canopy 10. The arrangement of the base 12 of the parachute canopy 10 to the apex 11 of the parachute canopy 10 is shown in FIGS. 2–4. In the pack configuration shown in FIG. 1, the parachute canopy has been gathered into folds 20, whereby the folds 20 have been disposed on a platform 16 arranged on the apex 11 of the parachute canopy 10. The platform 16 supports a control apparatus 17 which includes a flow measuring device 18 extending from the platform 16 into the region of the deploying parachute canopy (FIGS. 2–4). Individual folds 20 are gathered together by control lines 19 into deployment zones such that the sequential deployment of the parachute canopy 10 as individually shown in FIGS. 2–4 is effected.

In the illustrated embodiment, after the setting out of the parachute and the pre-extension of the system as shown in FIG. 1, there follows a measurement of the air flow velocity by the flow measuring device 18 or, alternatively, a determination of the bottleneck pressure by the control apparatus 17 such that the control apparatus 17 operates to release a corresponding fold as shown in FIG. 2 to effect deployment of the parachute canopy. The remaining folds are retained via the associated control lines 19 in gathered together condition so that only a limited opening surface of the parachute canopy 10 is available in the deployment condition shown in FIG. 2. Upon reaching the transition velocity for the second stage of deployment, the control apparatus 17, via an available line cutter and through cutting of the respective ones of the control lines 19, releases the next following deployment zone, whereby the surface of the parachute canopy 10 available for deceleration duty enlarges to the dimension shown in FIG. 3. Upon reaching further reduced velocities, the control apparatus 17 releases the corresponding next following deployment zones. As the sequential deployment of the deployment zones progresses, the rigging lines 13 lengthen about the form of the released folds.

Additionally, in correspondence with the air flow velocity measured by the flow measuring device 18, a targeted deployment of the parachute canopy 10 can be effected as a function of the actual velocity, whereby, in the event of a correspondingly low velocity, a cutting of all of the control lines 19 can be immediately effected so that a complete deployment of the parachute canopy 10 is possible in the event of a correspondingly low velocity without being preceded by sequential deployment.

As an alternative to the flow measuring device shown in the embodiment illustrated in FIG. 1, a deployment sequence of the individual deployment zones can be comprehensively electronically programmed into the control apparatus; it is also possible to provide a corresponding data storage device in which precalculated parameters of the necessary data relating to velocity and height can be stored, the control apparatus referencing such data to effect release of the deployment zones.

The features of the embodiments of the inventive subject matter, as set forth in the foregoing description, the patent claims, the abstract of the disclosure, and the drawings, can be important individually as well as collectively in desired combinations for the realization of the invention in its various embodiments.

What is claimed is:

1. A parachute comprising:

a parachute canopy having an apex and a base; and rigging lines attached to the base and attached to an object to be decelerated by the parachute, the parachute canopy and the rigging lines being configured as a reefed pack with the parachute canopy being folded into a plurality of concentric folds one upon the other from the base to the apex across the full height of the parachute canopy.

2. A parachute according to claim 1 and further comprising a plurality of control lines, respective ones of the control lines being associated with respective ones of the concentric folds of the parachute canopy to form therewith individual deployment zones.

3. A parachute according to claim 2 wherein the control lines have differing breaking strengths thereamong.

4. A parachute according to claim 2 wherein each of the rigging lines is associated with a respective deployment zone and the rigging lines associated with a respective deployment zone are attached to the lowermost fold of the respective deployment zone.

5. A parachute according to claim 2 and further comprising a platform disposed at the apex of the parachute canopy.

6. A parachute according to claim 5 wherein the folds of the parachute canopy are disposed on the platform and are unrollable therefrom.

7. A parachute according to claim 5 and further comprising a control apparatus for targeted release of the folds.

8. A parachute according to claim 7 and further comprising a flow measuring device connected to the control apparatus.

9. A parachute according to claim 7 and further comprising a data storage device connected to the control apparatus for storing data relating to the deployment process of the parachute canopy.

10. A parachute according to claim 5 and further comprising line cutters controllable by the control apparatus to cut the respective control lines associated with a deployment zone which is to be deployed.

11. A parachute according to claim 1 wherein the parachute canopy includes a plurality of sections having different web constructions, each section being associated with a predetermined deployment zone.

* * * * *